United States Patent
Koltsov et al.

(10) Patent No.: US 12,342,192 B2
(45) Date of Patent: Jun. 24, 2025

(54) THREE-DIMENSIONAL INDOOR WIRELESS SERVICE ASSESSMENT AND VISUALIZATION

(71) Applicant: Ookla, LLC, Los Angeles, CA (US)

(72) Inventors: Artem Koltsov, Grants Pass, OR (US); Andrei Covaliov, North Bend, WA (US); Matthew Knebl, Aliso Viejo, CA (US)

(73) Assignee: Ookla, LLC, Los Angeles, CA (US)

( * ) Notice: Subject to any disclaimer, the term of this patent is extended or adjusted under 35 U.S.C. 154(b) by 569 days.

(21) Appl. No.: 17/681,086

(22) Filed: Feb. 25, 2022

(65) Prior Publication Data
US 2023/0061468 A1 Mar. 2, 2023

Related U.S. Application Data

(60) Provisional application No. 63/260,594, filed on Aug. 26, 2021.

(51) Int. Cl.
*H04W 24/08* (2009.01)
*H04L 43/045* (2022.01)
*H04W 4/029* (2018.01)

(52) U.S. Cl.
CPC .......... *H04W 24/08* (2013.01); *H04L 43/045* (2013.01); *H04W 4/029* (2018.02)

(58) Field of Classification Search
CPC ....... H04W 24/00; H04W 4/00; H04W 24/08; H04W 4/029; H04L 43/00; H04L 43/045; H04L 67/75; H04L 43/08
See application file for complete search history.

(56) References Cited

U.S. PATENT DOCUMENTS 10,701,566 B1 6/2020 Yoon
2005/0176441 A1* 8/2005 Jurecka .................. G01S 19/47
342/357.46

(Continued)

FOREIGN PATENT DOCUMENTS

JP 2020002651 1/2020
KR 10-2018-0126017 A 11/2018
(Continued)

OTHER PUBLICATIONS

International Search Report and Written Opinion for International Application No. PCT/US2022/032094 mailed Oct. 7, 2022, 16 pages.

(Continued)

*Primary Examiner* — Jung H Park
(74) *Attorney, Agent, or Firm* — Aikin & Gallant, LLP

(57) ABSTRACT

Disclosed are methods of generating a visual representation of a wireless service conditions in a three-dimensional display comprising: capturing, from a wireless device, a collection of data comprising wireless service conditions; determining from the data, a latitude and longitude and determining a reference altitude based on said latitude and longitude; determining from the data, a reported altitude in a coordinate system of choice; subtracting the reference altitude from the reported altitude in the coordinate system of choice; determining an estimated above-ground elevation of the data; and displaying in a visual representation the wireless service condition within a three-dimensional graphical image.

27 Claims, 6 Drawing Sheets

(56) References Cited

U.S. PATENT DOCUMENTS

| | | | |
|---|---|---|---|
| 2016/0055832 A1* | 2/2016 | Dicklin | G06F 16/29 |
| | | | 345/629 |
| 2017/0123072 A1* | 5/2017 | Miya | G01S 19/40 |
| 2018/0171648 A1 | 6/2018 | Woodward | |
| 2018/0363307 A1 | 12/2018 | Parker | |
| 2019/0028358 A1 | 1/2019 | Chen et al. | |
| 2020/0413266 A1* | 12/2020 | Yoon | H04L 41/147 |

FOREIGN PATENT DOCUMENTS

| WO | 2020190184 | 9/2020 | | |
|---|---|---|---|---|
| WO | WO-2020190184 A1 * | 9/2020 | | B64C 39/024 |

OTHER PUBLICATIONS

International Preliminary Report on Patentability received for PCT Patent Application No. PCT/US2022/032094, mailed on Mar. 7, 2024, 11 pages.
Office Action received for Korean Patent Application No. 10-2024-7008036, mailed on Mar. 14, 2025, 17 pages (9 pages of Original Document and 8 pages of English Translation).

* cited by examiner

THREE-DIMENSIONAL INDOOR WIRELESS SERVICE ASSESSMENT AND VISUALIZATION

CROSS REFERENCE TO RELATED APPLICATIONS

This application claims the benefit of U.S. Provisional Application No. 63/260,594 filed on Aug. 26, 2021, the disclosure of which is incorporated herein by reference in its entirety.

FIELD OF THE INVENTION

The invention is related to systems and methods for displaying and reporting wireless service conditions within vertical structures and in map views.

BACKGROUND OF THE INVENTION

Handheld mobile devices are ubiquitous in modern society. They provide access to wireless services such as voice, SMS, and Internet via an interconnected network of transceivers. Communication between the mobile devices and the network transceivers is performed via electromagnetic waves in the form of radio signals. In order to achieve and sustain good communication, these radio signals must meet predefined levels of strength and quality. Signal strength describes the amplitude of the desired signal. Signal quality is defined as the ratio between the amplitude of the desired signal versus the amplitude of all other signals with the latter also referred to as interference power.

Buildings present a challenge for wireless communication because they can block (prevent), attenuate (reduce the strength), distort (reduce the quality), or reflect (bounce) the propagation of signals. Such negative changes to the signals could be caused by a number of factors including: the size and location of the building, or the location of the wireless device within the building.

Since signal interference is a key indicator of negative impact to signal quality, it receives the highest level of scrutiny by parties interested in design, deployment and service of wireless networks. Interference can be caused by a wireless network's own design and operation with lack of signal dominance being an example, where signals from multiple surrounding network transceivers are received with similar strengths. In tall buildings, this effect is observed most commonly due to fewer obstructions between network transceivers and mobile devices. External sources of interference (noise), which further exacerbate the impact on signal quality within buildings, also include spurious emissions from other transceivers, intermodulation products in closely located antennas, natural sources including but not limited to thunderstorms, electrical storms, cosmic background radiation, etc. A Key Performance Indicator (KPI) used to quantify the signal quality is the signal-to-noise ratio (SNR).

SUMMARY OF THE INVENTION

The embodiments herein are related to methods and three-dimensional visualizations related to measurements of wireless service conditions and for generating a visualization having three dimensions so as to populate the visualization with a plurality of measurements, and wherein the visualization displays the collated set of measurements to show trends within the wireless service conditions on the visual display. Various embodiments provide methods for obtaining the measurements, modifying the data, and for generating data sets of said measurements for their display. The measurements may be gathered from crowd sourced data. The end product and output yield a visual display that identifies a set of or plurality of measurements and defines one or more wireless service conditions at a given height at a given location. Thus, you can determine wireless service conditions in a particular building at a particular height. These wireless service conditions include but are not limited to the signal strength and signal quality. The wireless service conditions, density of users and other features may be graphically depicted on a map in the form of visual representations and such features within vertically extruded polygons, which represent sections of buildings at a given location. Such information is useful for providers who seek to optimize service within these areas.

In a preferred embodiment, a method of generating a visual representation in three dimensions of wireless measurements comprising: (a) capturing a collection of data from one or more wireless devices; (b) determining a latitude and a longitude from the collection of data and determining a reference altitude based on said latitude and said longitude; (c) determining a reported altitude in a coordinate system of choice from the collection of data; (d) subtracting the reference altitude from the reported altitude in the coordinate system of choice; (e) determining an estimated above-ground elevation of the collection of data; and (f) displaying a visual representation of the collection of data within a three-dimensional graphical image.

In a further embodiment, the reported altitude is a WGS 84 altitude.

In a further embodiment, the method further comprising providing an absolute threshold to the collection of data by filtering the collection of data by said absolute threshold. In a further embodiment, the absolute threshold is between 1 meter and 100 meters.

In a further embodiment, the method further comprising providing a relative threshold to the collection of data. In a further embodiment, the relative threshold is between 80% and 99% of a total number of samples in a dataset.

In a further embodiment, the method further comprising displaying a user density. In a further embodiment, the method further comprising displaying a wireless service condition. In a further embodiment, the method further comprising displaying a wireless service condition and a user density.

In a further embodiment, the method further comprising displaying the collection of data in a predetermined height segment.

In a further embodiment, the method further comprising a plurality of wireless measurements and displaying the wireless measurements in the visual representation within polygons segmented in sections.

In a further embodiment, the wireless service condition is selected from the group consisting of: 5G CSI-RSRP, 5G CSI-RSRQ, 5G CSI-SINR, 5G SS-RSRP, 5G SS-RSRQ, 5G SS-SINR, 5G PCI, 5G Most Frequent Cell, 5G Strongest Cell, 5G Most Frequent Band, 5G Strongest Band, 5G Optimization Priority, LTE CQI, LTE Most Frequent Band, LTE Most Frequent Cell, LTE Most Frequent PCI, LTE Most Frequent TAC, LTE Optimization Priority, LTE RSRP, LTE RSRQ, LTE SNR, LTE Strongest Band, LTE Strongest Cell, LTE Strongest PCI, LTE Strongest TAC, UMTS Ec/No, UMTS Most Frequent Band, UMTS Most Frequent Cell, UMTS Most Frequent LAC, UMTS Most Frequent PSC, UMTS RSSI, UMTS Strongest Band, UMTS Strongest Cell, UMTS Strongest LAC, UMTS Strongest PSC, GSM Most Frequent Band, GSM Most Frequent B SIC, GSM Most Frequent Cell, GSM Most Frequent LAC, GSM RSSI, GSM Strongest Band, GSM Strongest B SIC, GSM Strongest Cell, GSM Strongest LAC, CDMA Edo, CDMA RSSI, EVDO EcIo, EVDO RSSI, User Density, Mobile Data Usage, WiFi Data Usage, Mobile+WiFi Data Usage, Downlink Throughput, Uplink Throughput, Jitter, Latency, Best Carrier 5G CSI-RSRP, Best Carrier 5G CSI-RSRQ, Best Carrier 5G CSI-SINR, Best Carrier 5G SS-RSRP, Best Carrier 5G SS-RSRQ, Best Carrier 5G SS-SINR, Best Carrier GSM RSSI, Best Carrier LTE CQI, Best Carrier LTE RSRP, Best Carrier LTE RSRQ, Best Carrier LTE SNR, Best Carrier UMTS Ec/No, Best Carrier UMTS RSSI, Coverage Improvement Opportunities, Multi-Network Coverage Improvement Score, Optimization Opportunities, Sales Opportunities, Percent Low Band, Timing Advance, and combinations thereof.

In a preferred embodiment, a method of generating a visual representation in three dimensions of a wireless measurement comprising: (a) capturing a wireless measurement from a wireless device; (b) determining a latitude and a longitude from the wireless measurement and determining a reference altitude from said latitude and said longitude; (c) determining a reported altitude in a coordinate system of choice from the wireless measurement; (d) subtracting the reference altitude from the reported altitude in the coordinate system of choice; (e) determining an estimated above-ground elevation of the wireless measurement; and (f) generating a polygon on the visual representation corresponding to the estimated above-ground elevation so as to contain the wireless measurement based upon a predetermined threshold of a plurality of measurements.

In a further embodiment, the polygon is generated according to between 90% and 99% of the measurements, each of said measurements being defined within a given range of latitude and longitude.

In a further embodiment, the given range of latitude and longitude are oriented to be within a polygon based on a predetermined threshold.

In a further embodiment, the predetermined threshold is an absolute measurement of distance or a relative measurement based on a portion of all measurements.

In a preferred embodiment, a method of generating a visual representation of a wireless service condition in a three-dimensional display comprising: (a) capturing a measurement comprising wireless service conditions from a wireless device; (b) determining a latitude and a longitude from the measurement and determining a reference altitude based on said latitude and said longitude; (c) determining a reported altitude in a coordinate system of choice from the measurement; (d) subtracting the reference altitude from the reported altitude in the coordinate system of choice; (e) determining an estimated above-ground elevation of the measurement; and (f) displaying the wireless service condition within a three-dimensional graphical image in a visual representation.

In a further embodiment, the method further comprising providing a predetermined absolute threshold or relative threshold to the latitude and longitude.

In a further embodiment, the method further comprising providing a predetermined absolute threshold or relative threshold to the reported altitude in a coordinate system of choice.

In a further embodiment, the method further comprising orienting the estimated above-ground elevation within a section of a three-dimensional graphical image. In a further embodiment, a section of the three-dimensional graphical image is between 5 meters and 50 meters in height. In a further embodiment, the section of the three-dimensional graphical image is 15 meters in height. In a further preferred embodiment, the measurement is displayed within the section on the visual display and a plurality of measurements is aggregated to display trends regarding the wireless service conditions within sections on the visual display at a given latitude and longitude (i.e., what are the wireless service conditions at a given height at a given location).

In a preferred embodiment, a three-dimensional representation of wireless service conditions comprising: a plurality of data measurements, each data measurement defined by a measured latitude and longitude, and wherein each data measurement is provided with a reported altitude; determining a ground elevation at the measured latitude and longitude; wherein a determined altitude is generated by comparing the reported altitude with the ground elevation and determining a delta to yield the determined altitude; wherein each of said plurality of data measurements are displayed within the three-dimensional representation of wireless service conditions and arranged based on the measured latitude and longitude within slices in a vertical axis based on the determined altitude, wherein the slices are of a distance of between 5 meters and 50 meters; and wherein each of said data measurement comprises at least one wireless service condition.

In a further embodiment, for the three-dimensional representation of wireless service conditions the wireless service condition is selected from the group consisting of: 5G CSI-RSRP, 5G CSI-RSRQ, 5G CSI-SINR, 5G SS-RSRP, 5G SS-RSRQ, 5G SS-SINR, 5G PCI, 5G Most Frequent Cell, 5G Strongest Cell, 5G Most Frequent Band, 5G Strongest Band, 5G Optimization Priority, LTE CQI, LTE Most Frequent Band, LTE Most Frequent Cell, LTE Most Frequent PCI, LTE Most Frequent TAC, LTE Optimization Priority, LTE RSRP, LTE RSRQ, LTE SNR, LTE Strongest Band, LTE Strongest Cell, LTE Strongest PCI, LTE Strongest TAC, UMTS Ec/No, UMTS Most Frequent Band, UMTS Most Frequent Cell, UMTS Most Frequent LAC, UMTS Most Frequent PSC, UMTS RSSI, UMTS Strongest Band, UMTS Strongest Cell, UMTS Strongest LAC, UMTS Strongest PSC, GSM Most Frequent Band, GSM Most Frequent BSIC, GSM Most Frequent Cell, GSM Most Frequent LAC, GSM RSSI, GSM Strongest Band, GSM Strongest B SIC, GSM Strongest Cell, GSM Strongest LAC, CDMA EcIo, CDMA RSSI, EVDO Edo, EVDO RSSI, User Density, Mobile Data Usage, WiFi Data Usage, Mobile+WiFi Data Usage, Downlink Throughput, Uplink Throughput, Jitter, Latency, Best Carrier 5G CSI-RSRP, Best Carrier 5G CSI-RSRQ, Best Carrier 5G CSI-SINR, Best Carrier 5G SS-RSRP, Best Carrier 5G SS-RSRQ, Best Carrier 5G SS-SINR, Best Carrier GSM RSSI, Best Carrier LTE CQI, Best Carrier LTE RSRP, Best Carrier LTE RSRQ, Best Carrier LTE SNR, Best Carrier UMTS Ec/No, Best Carrier UMTS RSSI, Coverage Improvement Opportunities, Multi-Network Coverage Improvement Score, Optimization Opportunities, Sales Opportunities, Percent Low Band, Timing Advance, and combinations thereof.

In a further embodiment, for the three-dimensional representation of wireless service conditions an absolute filter or relative filter is applied to the measured latitude and longitude.

In a further embodiment, for the three-dimensional representation of wireless service conditions an absolute filter or relative filter is applied to the determined altitude.

In a further embodiment, for the three-dimensional representation of wireless service conditions the method further comprising an indoor classification wherein the indoor classification is required for the data measurements to be utilized in the three-dimensional representation of wireless service conditions.

DETAILED DESCRIPTION OF THE INVENTION

Figure 1:
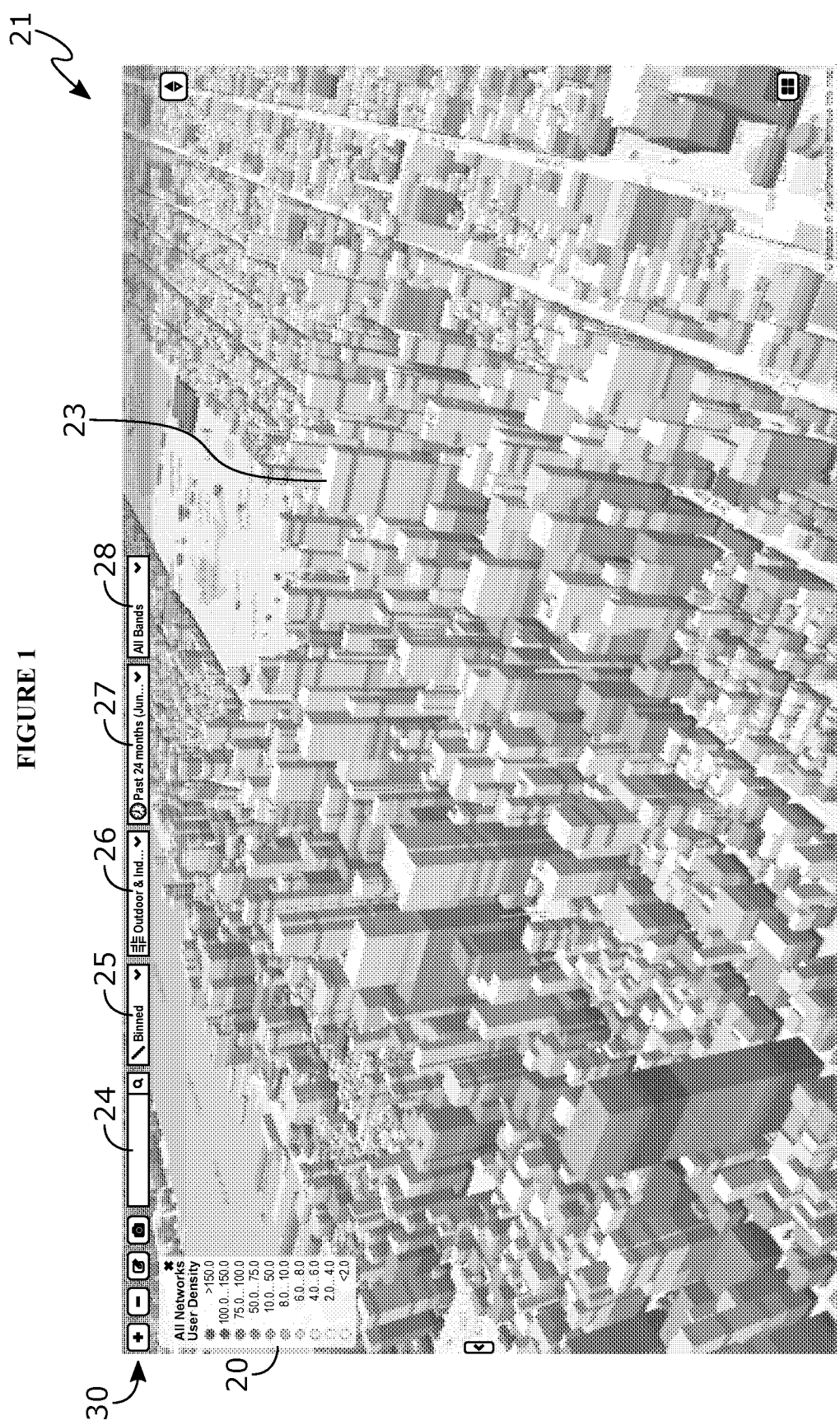
FIG. 1 is a representation of a 3D view of a network user density map.

Disclosed are techniques for providing wireless service conditions performance within a three-dimensional (3D) graphical representation. The 3D view allows for a representation of multiple sets of data in a visual display, including the mobile device density and the quality of the wireless service at a given elevation within a building. This representation can be organized by the generation of wireless service (GSM, UMTS, LTE, 5G), by the particular service provider, as well as the metric describing the wireless service conditions performance. The resulting 3D graphical representations provides a user-friendly visualization of areas of strong and weak wireless service conditions which allows service providers to quickly and efficiently prioritize their efforts in addressing issues with network performance.

Compared to the typical 2D approach to network performance design and optimization which squashes all network conditions metrics into a single horizontal plane, the 3D representation provides a more refined, layered view of the network conditions as experienced by mobile devices depending on their elevation location within a building.

Wireless service conditions refers to the data collected from mobile devices that includes, but is not limited to following metrics: 5G CSI-RSRP, 5G CSI-RSRQ, 5G CSI-SINR, 5G SS-RSRP, 5G SS-RSRQ, 5G SS-SINR, 5G PCI, 5G Most Frequent Cell, 5G Strongest Cell, 5G Most Frequent Band, 5G Strongest Band, 5G Optimization Priority, LTE CQI, LTE Most Frequent Band, LTE Most Frequent Cell, LTE Most Frequent PCI, LTE Most Frequent TAC, LTE Optimization Priority, LTE RSRP, LTE RSRQ, LTE SNR, LTE Strongest Band, LTE Strongest Cell, LTE Strongest PCI, LTE Strongest TAC, UMTS Ec/No, UMTS Most Frequent Band, UMTS Most Frequent Cell, UMTS Most Frequent LAC, UMTS Most Frequent PSC, UMTS RSSI, UMTS Strongest Band, UMTS Strongest Cell, UMTS Strongest LAC, UMTS Strongest PSC, GSM Most Frequent Band, GSM Most Frequent B SIC, GSM Most Frequent Cell, GSM Most Frequent LAC, GSM RSSI, GSM Strongest Band, GSM Strongest B SIC, GSM Strongest Cell, GSM Strongest LAC, CDMA EcIo, CDMA RSSI, EVDO EcIo, EVDO RSSI, User Density, Mobile Data Usage, WiFi Data Usage, Mobile+WiFi Data Usage, Downlink Throughput, Uplink Throughput, Jitter, Latency, Best Carrier 5G CSI-RSRP, Best Carrier 5G CSI-RSRQ, Best Carrier 5G CSI-SINR, Best Carrier 5G SS-RSRP, Best Carrier 5G SS-RSRQ, Best Carrier 5G SS-SINR, Best Carrier GSM RSSI, Best Carrier LTE CQI, Best Carrier LTE RSRP, Best Carrier LTE RSRQ, Best Carrier LTE SNR, Best Carrier UMTS Ec/No, Best Carrier UMTS RSSI, Coverage Improvement Opportunities, Multi-Network Coverage Improvement Score, Optimization Opportunities, Sales Opportunities, Percent Low Band, and Timing Advance. Notably, these wireless service conditions are gathered simultaneously as data from a mobile device and thus use of one portion of the data can be combined with other portions of the data to make further extrapolations. Wireless data further refers to any additional metrics that may be collected, including but not limited to latitude, longitude, altitude, vertical and horizontal accuracy, time, and other various metrics. Each collected measurement includes all of the data and all of the wireless service conditions, and said measurements can be stored within a database.

In buildings, the dominant factors of degradation in signal level and quality are: penetration losses (signal weakens while passing through dense mediums such as concrete walls, metallic panels, etc.), reflections (signal is redirected by dense mediums of surrounding buildings and structures), and shadowing (signal is blocked by dense mediums of surrounding buildings, structures, vegetation). At ground levels, these factors typically lead to coverage containment (i.e., the signal level from the closest network transceiver overpowers the signal levels from transceivers farther away) and thus high signal dominance, which in turn leads to low interference. By contrast, within tall buildings, with increased elevation, the number of obstructions in the path of the signal from network transceivers far away are fewer, thus leading to low signal dominance and with it, higher interference.

To correct a weak signal, modifications such as addition of a network transceiver or change in the directional spread along an azimuth or elevation of an existing network transceiver antenna can be implemented. Once signal strength is within a desired range, further optimization is performed in order to reduce the interference level.

In addition to factors outlined previously, an elevated interference could be caused by harmonics, frequency drifts, RF leakage, as well as internal interference caused by conductivity of passive devices, such as connectors, antennas, cables and the like. Interference may also be caused by frequency reallocation. Operators reallocate the licensed frequency spectrum between technologies; for example, as usage decreases on older generations of services, spectrum is shifted to newer technologies to accommodate more users and traffic. Users still using the legacy technologies are served by smaller amount of spectrum, and due to frequency reuse (multiple transceivers using the same frequency) experience higher interference.

In some instances, intermodulation of frequencies could occur when two or more signals on different frequencies mix (multiply) in a nonlinear electronic component within the mobile device or network transceiver, leading to a signal generated at a frequency other than the one transmitted on. Interference occurs when the unintended frequency that the signal is received on overlaps with the frequency already in use.

With the various possible interference problems identified, graphically representing the density of users as well as signal and interference levels, allows for a simple representation of these features within a 3D view, thus allowing providers to more easily assess problem areas. The volume of unique mobile devices and number of measurements collected within a building can also help quantify the quality of the data gathered by reducing the metrics variance and presenting the true mean.

Accordingly, once wireless service conditions have been identified that require modification, changes can be made to the transceiver network to improve performance of the wireless service conditions. Interference in wireless networks can be managed through coverage containment and reduction of overlap between neighboring transceivers. Interference is also typically reduced through adjustment of cell site antennas and various settings in the network control software. For example, antenna beams may be focused more towards target areas and buildings, and transmitter power, frequency, and code settings may be modified to increase signal level from desired network transceivers and reduce signal level of undesired network transceivers in the target areas and buildings.

The data and wireless service conditions collected and utilized in the graphical representations of wireless service conditions allows for capture of representative samples of users in the wireless network. In each case, a single data measurement contains all of the data information as well as the wireless service conditions. This allows for the placement of the measurement within the display, based on its location, in the horizontal x- and y-axes, as well as in the vertical z-axis. Then, the measurement itself contains all of the relevant wireless service conditions associated therewith, which can be effectively stored within a database. Thus, combining a plurality of measurements provides a data set, and wherein a larger data set provides increased reliability towards certain trends that may be visible within that data set.

By capturing such datasets, an end user can be confident in the reliability of the dataset through the sheer number of dataset points collected, with users understanding that greater numbers of dataset points become more reliable than smaller number of data set points. Simultaneously, higher priority can be given to areas with greater densities so as to improve wireless service conditions for a greater number of users, when the dataset reveals that certain areas require changes to improve the signal strength or reduce interference, or any other of the various wireless service conditions determined to be relevant.

Accordingly, now turning to the figures, FIG. 1 details a graphical view (21) of the user density within a 3D representation. This allows for the generation of a vertical axis (the height of the buildings), which identifies the relative buildings in their physical locations, and charts in FIG. 1, the density of users within that space according to the legend (20) on the visual display. FIG. 1 provides a simple representation of all networks with their relative density at particular height sections within the visual window. Accordingly, when there is a building of fifty floors, but the bottom five floors are parking, the graphical representation will include several different sections of the building, and will depict relative densities of wireless network data collected at those points. Therefore, as parking structures are usually not continuously habituated, there would be depicted a lower density of network users in the parking spaces at the bottom five floors, as people are generally not using their network services for long durations of time in those spaces. By contrast, the working space floors or living space floors would have a higher density of users and can so be identified. In other cases, an industrial building or warehouse may have a low number of users, while residential and commercial office spaces may have higher densities. A greater number of dataset points increases the reliability of the dataset and also directs optimization priority based on the density of users in these spaces.

In choosing the most elegant way to represent density, the legend (20) provides different shading or other metric that is easily viewed by a user. However, those of ordinary skill in the art will recognize that the visual and graphical representation can be made with, for example, a color theme representation, with different colors representing different levels of user density or using different shading or fill patterns. Essentially, the representation in some formats is like a heat map, which can provide visual representations of the wireless service conditions or the data, for example the user density, within slices in the vertical axis. The result is a visual display (21) that allows for a building (23), as one building in the visual display (21) to be shaded according to density of users at an estimated height within the building (23).

The visual display (21) further includes a search bar 30 that includes a search window (24), and various fields (e.g., 24-28) for a user to modify the display. For example, the search window (24) may allow for unique searches, the switch field (25), allows for swapping between heat map or binned data view, where the binned data view is only used in a 2D mode. The next field allows for classifications, e.g., outdoor and indoor 26, which may just be outdoor or just indoor; a time window (27), e.g., as depicted during the prior 24 months, and a band window (28), allowing for review of different frequency bands for a wireless service. The number of fields can be modified to include any number of data sets related to wireless service conditions or points extrapolated from the data, each of which can be further based on the user density.

Figure 2:
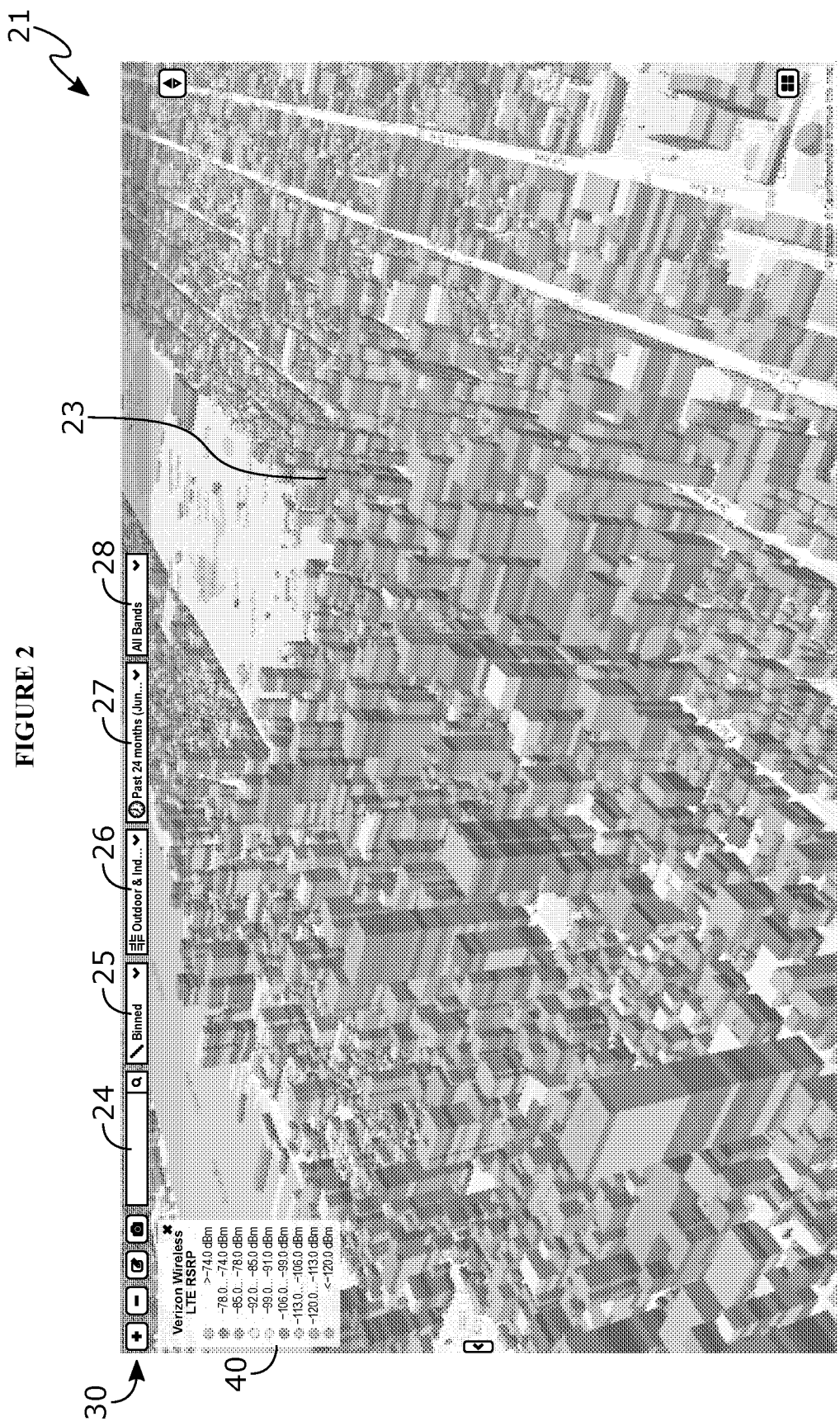
FIG. 2 is a representation of a 3D view of a network performance for a single carrier on a single platform, measuring RSRP.

FIG. 2 then is variation of FIG. 1, where the legend (40) provides a singular view of an individual carrier using the LTE band and displaying the Reference Signal Received Power (RSRP) metric within the visual representation. Thus, it is easy to toggle between different wireless service conditions metrics to generate maps of interest to the user.

In order to generate the visual displays of FIGS. 1 and 2, population data set may be captured by harvesting data from users and then collecting and modifying the data in a new and unique manner, organized in databases, and then displayed in the graphical representations. The data to fill these views is captured via mobile devices on the network and aggregated within a database. For example, the Android OS reports GPS data including the horizontal and vertical geographic location where a measurement was collected including the latitude and longitude coordinates (decimal degrees, WGS 84), altitude, horizontal accuracy and vertical accuracy. The data may also be specifically collected from devices that utilize an application or program on the wireless device, designed to capture the above data points, or designed to capture additional data points that may be relevant.

A key issue in displaying the collected data or the wireless service conditions is the ability to display such information in an easily useable format. A first issue is that in orienting the datasets within the vertical axis, mobile devices are reporting vertical location in a specific coordinate system. For example, one of the several coordinate systems is WGS 84, which is used as an example throughout, however, those of ordinary skill in the art will recognize that other coordinate systems exist and are in use, specifically in different areas in the world. However, each of these coordinate systems are not with respect to ground altitude and thus yielding results that need to be modified. Indeed, in WGS 84, vertical location is reported in meters above the Earth's geoid (an imaginary surface which is determined by the earth's gravity and approximated by Mean Sea Level), rather than height above the ground (orthometric). To calculate the measurement's elevation above ground level, the ground level altitude with respect to the geoid elevation is calculated at the reported location, then subtracted from the measurement's reported altitude. This calculation simply takes the delta between two measurements with respect to the same reference system (WGS 84) to yield the actual elevation (referenced from the ground at that latitude and longitude) for purposes of representing in the displays.

The horizontal and vertical location accuracy readings are important for capturing the true service conditions at a location. Accordingly, when a plurality of location data has a variance greater than a predetermined amount, then that data may be excluded from the dataset. This predetermined variance may depend on the situation and on the total number of measurements. For example, where there are a higher number of measurements, it may be more appropriate to use a tighter threshold for variance, i.e., a measurement of only ten meters, whereas when only ten measurements are available, a higher variance, i.e., fifty meters, would be acceptable. Furthermore, instead of an absolute measurement in meters, a relative calculation can be utilized to take the best data, for example, the middle 70%, 75%, 80%, 85%, 90%, 95%, 97%, or 99% of all data measurements and wireless service conditions sorted by elevation in ascending order. Thus, in a simple data set of ten measurements, using an 80% metric, the bottom data points and the top data points would be removed. Similarly, using a data set of 1,000 measurements, a 90% metric would eliminate a total of fifty measurements from the top and fifty from the bottom to yield the sample data set. These variables can be set and modified to user needs.

After filtering out measurements that do not meet the vertical and horizontal accuracy threshold variances for the given data, measurements are grouped into segments representing ranges of vertical levels (floors) within a building. These segments can be as short as one meter, but preferably fifteen meters. Alternatively, measurements can be grouped according to the height of a particular building so as to provide a maximum number of segments. For example, a building having five total segments and being 100 meters tall would yield segments of twenty meters in height. However, more than 70% of all buildings are shorter than 15 meters in height. By setting the segment height at 15 meters, we can group many buildings into a single segment, which allows us to eliminate false data that might exist if we tried to make five or ten meter segments and to group the data within these smaller sections. The average values for the grouped measurements are presented in a visual portal and display as depicted by FIGS. 1 and 2.

Figure 3:
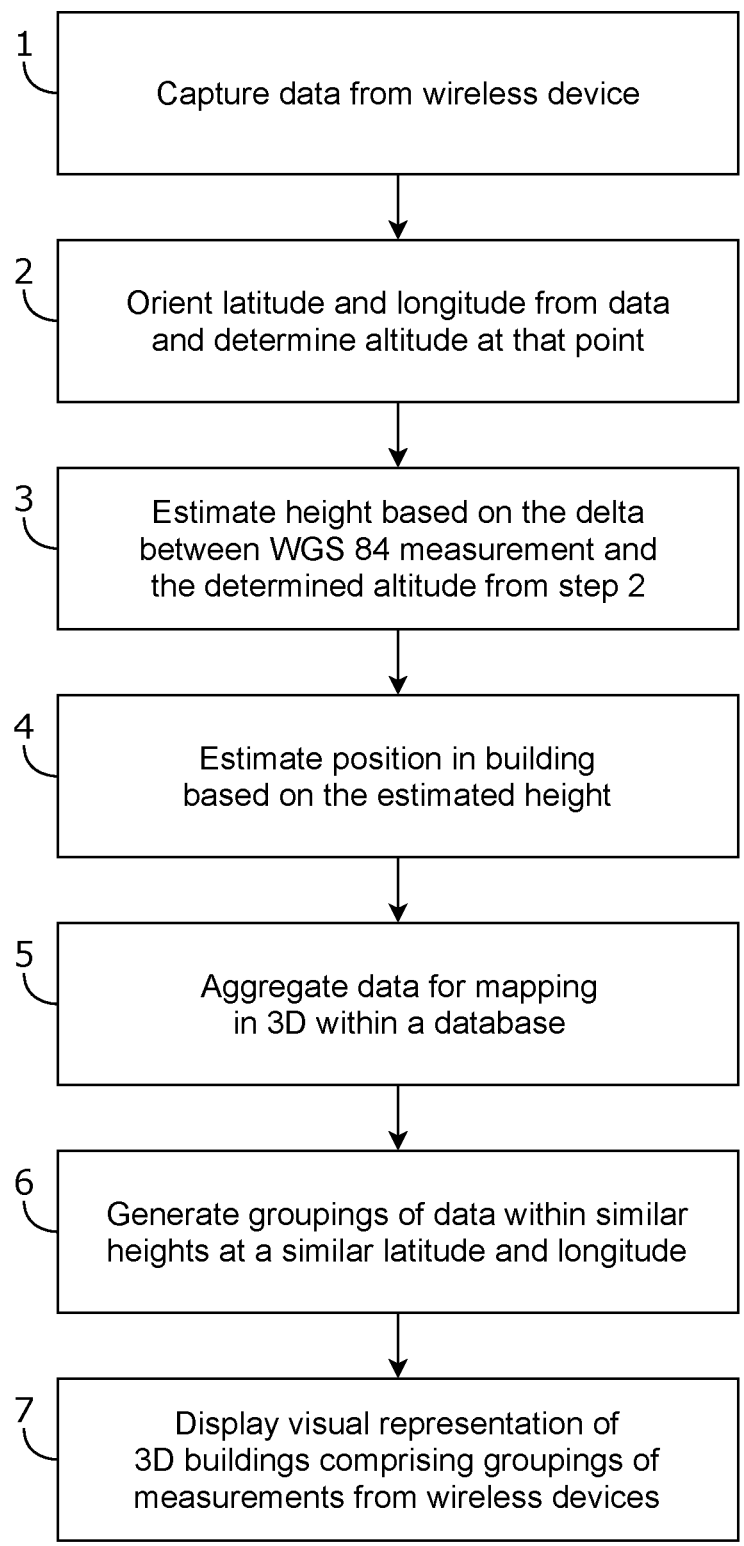
FIG. 3 is a flow diagram of a process for generating vertical measurements within a 3D view.

FIG. 3 provides an overview of one method for utilising the captured data regarding wireless service conditions so as to modify and utilize the data for presentation. Step (1) provides capturing the data from the wireless device. As detailed above, the data includes but is not limited to: latitude, longitude, location horizontal accuracy, location vertical accuracy as well as wireless service conditions.

Step (2) then utilizes the collected location data to determine the above-ground elevation for each measurement. The precise location relative to the ground is provided by the data with the defined latitude and longitude of that measurement. A database is provided that identifies the ground elevation at each given latitude and longitude. The horizontal accuracy is provided with these measurements in view of the latitude and longitude. Where the horizontal accuracy is within the distance of the building, the data can be assumed as accurate. Where the horizontal accuracy is greater than the distance/footprint of the building, then certain filtering protocols may be used, for example to eliminate data of a distance greater than x meters (i.e., an absolute threshold), or we can apply a relative threshold as detailed herein. In certain cases, the horizontal accuracy is less important, because the ground is level and thus variance is negligible. The data for one building adjacent to another building is likely to be highly conserved. Accordingly, such variance may not impact that data in a material manner. However, in a hilly neighborhood (e.g., San Francisco), even a distance of 15 meters in any horizontal direction may yield a significant change in the ground elevation. In such instances, the predetermined threshold cutoffs in data may need to be modified to ensure accuracy of the data in such circumstances.

Step (3) then takes the known latitude and longitude determined measurement and estimates the height based on the measured data. Accordingly, the ground elevation converted to the relevant coordinate system, e.g., WGS 84 vertical elevation (altitude with respect to Earth's Ellipsoid) is determined for each building using data from third-party DEM (Digital Elevation Model) or DSM (Digital Surface Model). Next, since location data collected by wireless devices is already in WGS 84 coordinate system (as reported by the device's GPS), the measurement's above-ground elevation is calculated as the arithmetic difference between the measurement's elevation and ground elevation. To the extent that another elevation measurement is utilized, then the appropriate correction would be made, as necessary based on that measurement. The resulting data being a corrected elevation for the measurement so as to accurately place it within a visual display polygon. This yields a measurement for each of the data points at a given elevation.

Step (4) then allows for an estimation of the measurement within the building, based on the measurement's above-ground elevation calculated from step (3). Where the height of the building is known, this may be easy to do. In certain instances, and detailed more in FIG. 4, the height of a building of unknown height can be estimated from the collected measurements/data. Regardless of how the building height is determined or estimated, the data from a plurality of measurements is stored within a database and the database then aggregates the data for mapping in 3D in step (5).

Along the processes, certain measurements are provided with a known accuracy. Indeed, the data is often provided with a vertical accuracy measurement and a horizontal accuracy measurement. These measurements are frequently provided in units of meters (distance), and/or include a confidence level associated therewith. Certain measurements will have lower or higher accuracy readings and thus those with lower distances have a greater confidence of the actual location. In step (5), the data is grouped according to absolute measurements, meaning that data is only utilized if it has an accuracy measurement of less than a predetermined distance. In the various embodiments, this distance is between 1,000 meters and 0.01 meters, with the typical distances being less than 100 meters, less than 50 meters, less than 25 meters, less than 15 meters, and less than 10 meters, inclusive of all ranges of distance in between. However, the absolute variance is not always utilized and a relative threshold is often utilized where the data set is looked at as a whole and a portion of the data set is utilized to ensure accuracy. In these cases, the relative threshold is 50%, 60%, 70%, 75%, 80%, 85%, 90%, 95%, 97%, and 99% of the dataset, with the threshold representing the middle portion of the dataset. For example, the 80% threshold eliminates the top 10% and the bottom 10% of the dataset. The entire data set remains in the database, but the captured data and displayed data would then be the portions that are determined under the absolute or relative thresholds as defined herein. Thus, the data being presented in a visual display is specific to the precise measurement and allows for an accurate identification of an individual measurement.

Step (6) includes generating groupings of data within a similar height at a similar latitude and longitude. Again, taking the information related to the entire data set, the predetermined thresholds are utilized to determine what data to be displayed. Notably, there may be some ability to have variance, as not every measurement will have precisely the same latitude and longitude, nor the same error variances in the vertical axis. Accordingly, the grouping will best fit these measurements so that it can be best determined if the measurement is taken in the same building or an adjacent building. The variance here can depend on a number of factors, including the proximity of adjacent buildings as well as the error variance of the measurements.

Finally, step (7) entails displaying a visual representation of the data, an example of which is depicted in both FIGS. 1 and 2, which shows user density in FIG. 1 and RSRP for a single wireless carrier in FIG. 2. With each of the representations having a visual or display element that defines the visual or display element within the legend. An end user can take the display and modify the wireless service condition to modify the display based on that particular wireless service condition. This will allow for the representation of these different wireless service conditions. The density of users can be displayed in each case or can be visually presented in an underlying popup or other visual cue, as a user evaluates data in the visual representation.

In certain instances, the data yields measurements in a building of an unknown height or dimensions. This occurs when new construction has been finalized, or simply in places where that data is not provided publicly. In certain embodiments, buildings without known heights are extruded up from ground level based on reported measurement altitudes if the total user count for the building is ≥10. If <10, only the base segment (0 m to 15 m) is displayed. Extrusion continues up to the segment that contains x % of total building samples in that segment or below, for example, 97%. This helps to prevent displaying unrealistic building heights due to a small number of samples at very high altitudes. In some embodiments, if there are more than a predefined number (for example 8) of sequential segments without measurements, extrusions are stopped regardless of whether there is a known building height or not. If there is a known height, segments are displayed until building height is reached. If there are measurements present, the segment will be colored, otherwise it will be gray, or otherwise depicted by some other shading or visual cue.

Figure 4:
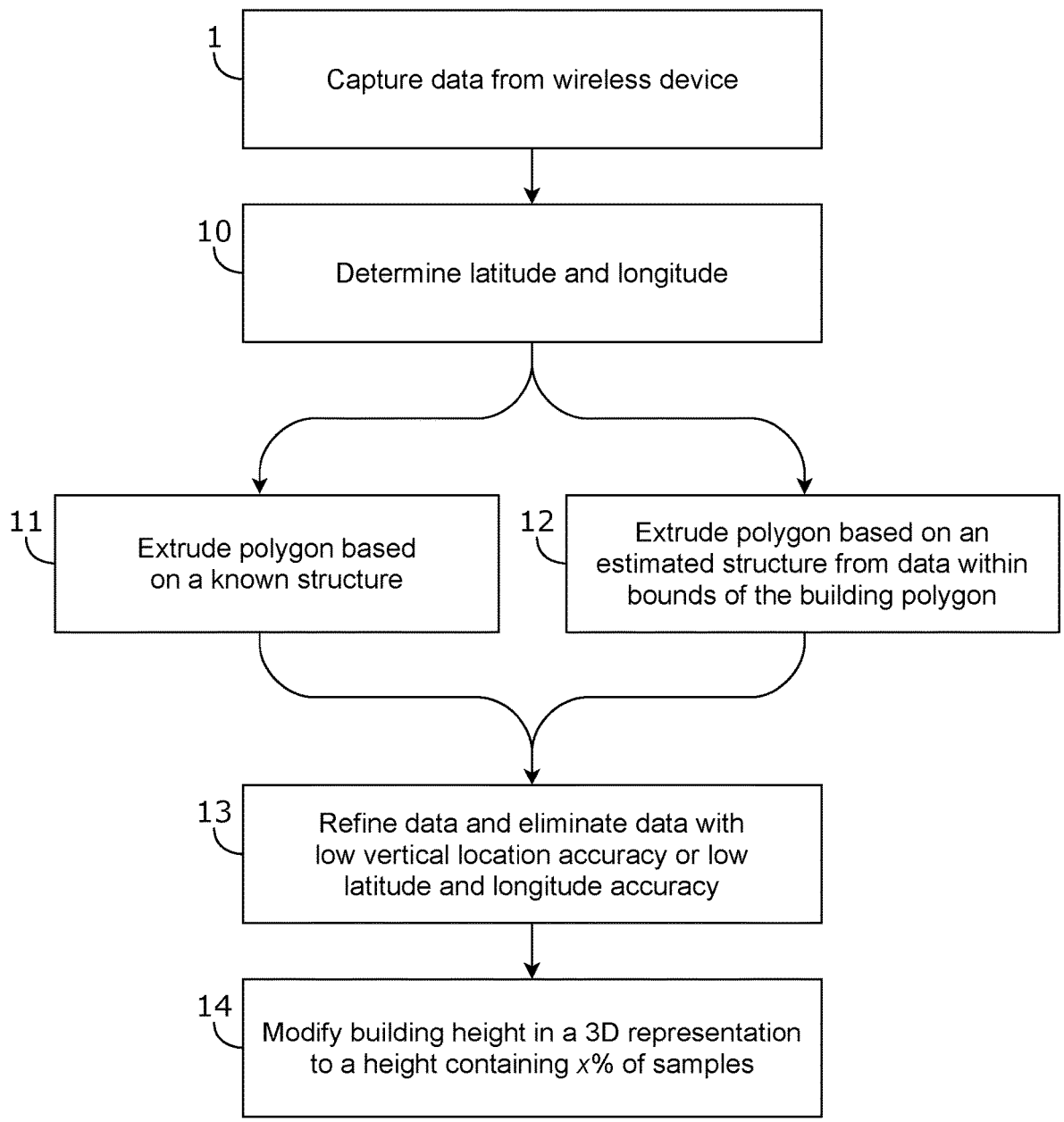
FIG. 4 is a flow diagram depicting a process of creating 3D polygons corresponding to buildings within a visual map.

Continuing with this logic, FIG. 4 then depicts a flow process for determining height of a polygon to be represented in the display window, e.g., as seen in FIGS. 1 and 2. Following FIG. 3, the first step is to collect data from the wireless device (1). Then using the data from that first step, determining the latitude and longitude (10). Once the first two steps have been completed, the next process defines a polygon height. Either step (11), where the polygon is extruded based on a known structure and height, or step (12), wherein the polygon is extruded based on an estimated structure from the data within the bounds of the building polygon. Indeed, it is this particular case where the height is not known that is important, but these steps can also work together to ensure accurate displays of buildings.

Indeed, even while a known structure may exist, its particular height, and dimensions may not be known with specificity. In other cases, the presence of a structure may not be known, such as a recently developed structure, and thus the collection of data signifies the presence of that structure to be displayed. Finally, certain structures may have errors or have spaces that are not utilized, that may otherwise create uncertainty in the visual display.

Accordingly, step (13) then takes the collective data and refines the data to eliminate outlier data. This is performed by eliminating data with low accuracy parameters, whether in the vertical location accuracy or with regard to latitude and longitude accuracy. This data is typically captured in step (1), i.e., a data point literally defines that accuracy estimate of the data point being captured. Preferably, a complete dataset of a plurality of measurements is combined and certain processes are utilized to filter the data to create the best dataset. The various accuracy metrics are the same as those detailed in FIG. 3, namely an absolute measurement of distance or a relative measurement that takes a portion of the data set to eliminate outlier data.

Finally, with the data being refined, the polygons from steps (11) or (12) can be modified, specifically in height, to contain x % of the samples in step (14). This allows for a revision of any of the heights of the polygons based on the data. Notably, the percentage of samples being contained in this step and in others is variable based upon several factors, including the total range, the total number of samples, the confidence measures of the data, and other factors. Typically, the percentage should be greater than 80% of the samples, and more preferably greater than 90%, 95%, 97% or 99% of the samples.

To provide context to this determination, a sample set includes 1,000 data points and there is a building of unknown height. The data set is set to a 97% of samples. The building height would begin with the lowest altitude measurements and then capturing a total of 970 measurements (reaching 97% of all samples). After the 970 samples are collected, the height of the building is determined at the highest measurement of that sample set. The remaining 30 higher measurements are excluded from the determined building height so as to exclude those measurements which might be inaccurate. This percentage can be modified according to the total number of measurements, the accuracy of those measurements and other parameters as determined in each scenario.

In certain instances, especially in large cities, there are often measurements that are underground. For example, a subway system or subway station in New York City may have thousands of measurements that are underground. In such cases, based on the latitude and longitude, the measurements for determining height will begin at those determined to be above ground level. Accordingly, if there were 10,000 measurements and 1,000 of them were determined to be below ground, 9,000 data points would be considered for the building height. If 97% of the samples would be used for the height, then 8,730 total samples would be used in the height calculation, while omitting the remaining 270 samples at higher altitudes.

Accordingly, as depicted in FIGS. 1 and 2, the visual display includes a plurality of buildings, each building represented by a polygon having a vertical direction as well as in the x and y coordinates. In certain embodiments, the size of the building, including specifically height, but also in some embodiments, the square footage in the x and y coordinates is provided or previously known. For example, building polygons and heights from third-party sources are used when available, but may be inaccurate. Buildings without known heights are extruded up from ground level based on reported measurement altitudes. Extrusions are added from the ground up and continue until x % of total building samples are contained within the 3D representation of the building. Using these cutoffs on a data sample set helps prevent display of unrealistic building heights due to inaccuracies or a small number of samples at very high altitudes. In buildings that still appear taller than actual, the top segment or segments typically have a very low user count (1 or 2) and can be ignored by using these cutoff metrics. The purpose here is to simply provide a data set that provides a representative sample of data for evaluating wireless service conditions metrics and reliability of those metrics based upon the density of users and total measurements of those wireless service conditions.

The data and wireless service conditions collected from the wireless devices (Step 1) in each of the methods provides a collective approach towards identifying the wireless service conditions, while identifying user density, and providing a visual approach in the z-axis (vertically). The results of this approach have been validated by comparing the data to real world examples. For example, the signal level and quality is very strong in buildings where there are known installations of in-building cell site systems, which are known to improve signal level and reduce interference. Furthermore, the data shows signal level increasing with height while simultaneously showing increasing levels of interference at higher elevations, as expected due to more interference on higher floors. Finally, the total user counts are available in the visual display to help the user determine the reliability of the presented information. Thus, the data allows a user to make their own determination of the displayed wireless service conditions if they so choose, by determining that the data had a high or low number of user counts as well as other metrics that may impact reliability.

In certain embodiments, it may be further useful to utilize an indoor classification technique, specifically at locations that are at lower levels within a building. This way, in an area where there are both significant indoor square footage as well as outdoor square footage, certain embodiments may allow for classification of indoor or outdoor measurements. This can be performed by using the collected data and comparing the footprint of the building with the latitude and longitude measurements and then evaluated in view of the horizontal accuracy measurements. Indeed, for all given measurements, the horizontal accuracy is necessary to ensure that a given measurement is in one building and not another. The indoor classification can further assist where horizontal accuracy is weak, or simply where additional data points may be desirable to increase the accuracy of the data. Certain indoor classification protocols are defined in U.S. patent application Ser. No. 16/381,961, which may be utilized in connection with the methods and processed detailed herein.

Figure 5:
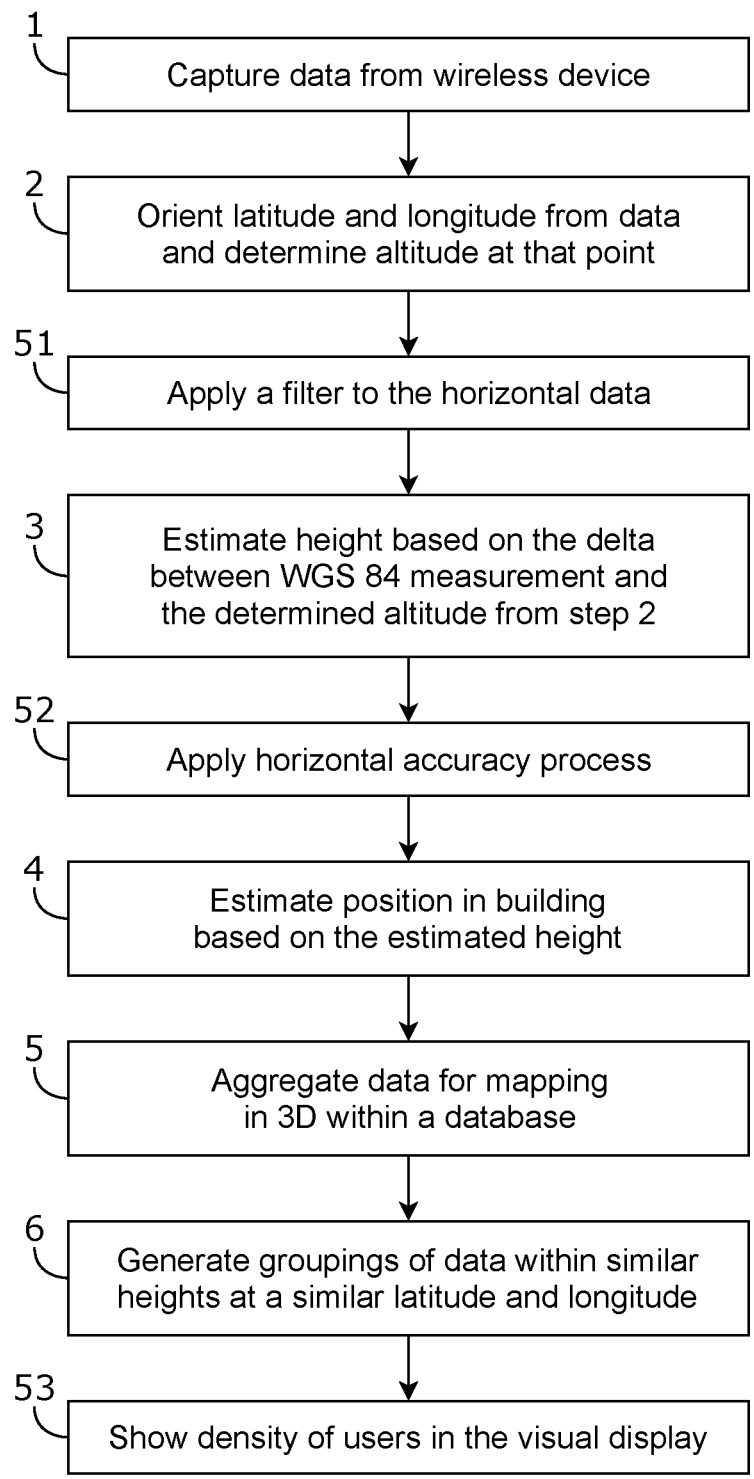
FIG. 5 depicts a flow diagram to generate a 3D display of user density.

Determining the density of users in a given location allows for increased confidence in the data as detailed herein. FIG. 5 provides a simple diagram of an embodiment to generate this information. Step (1) includes capture of the data from a wireless device. Step (2) orients the latitude and longitude form the data and determines the altitude at that point via a database. Step (51) then applies an initial filter to the data based on horizontal accuracy, for example, omitting data that has an accuracy rating that is beyond a predetermined allowable distance. Step (3) (following step [51]) estimates the height of a measurement based on the delta between the determined altitude and the measured data from the coordinate system (i.e., WGS 84). Step (52), optionally applies a further horizontal accuracy process, such as a relative process to secure the middle 90%, 95%, or 97% of measurements, or other appropriate process. Step (4) (following step [52]), then estimates the position in the building based on the estimated height. Step (5) then aggregates the data for mapping in 3D within a database. Step (6) generates groupings of data within similar heights at a similar latitude and longitude based upon the prior steps and threshold steps applied. And finally, step (53) provides for display of the user density in a visual display.

Figure 6:
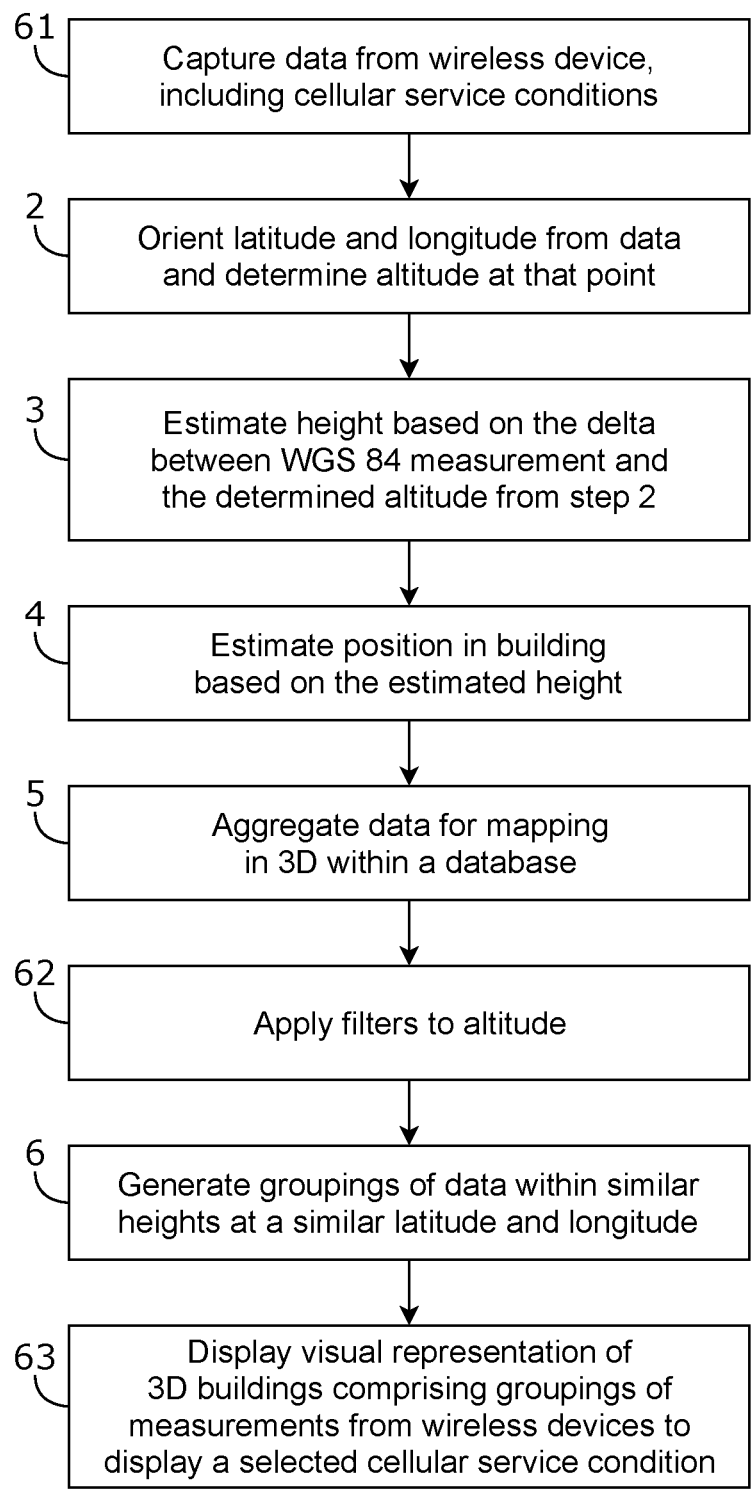
FIG. 6 depicts a flow diagram for generating a 3D display of wireless service conditions.

FIG. 6 applies a similar process towards evaluation of certain wireless service conditions based upon the disclosure herein. Step (61) captures data from a wireless device (from a plurality of wireless devices) including the wireless service conditions. Step (2) orients a single data measurement based on latitude and longitude the data and determines altitude at that point. Step (3) estimates the actual ground elevation based on the delta between the WGS 84 measurement and the determined altitude from the latitude and longitude. Where appropriate in each of steps (2) and (3), certain filters and thresholds can be applied to eliminate data with high variance based on absolute or relative thresholds. Step (4) then estimates the position in a building based on the estimated height. Step (5) then aggregates the data for mapping in 3D within a database. Step (62) (following step [5]) then applies a filter to all the data, as necessary to ensure data accuracy, which may be individually done, or in addition to the filters and thresholds optionally applied previously to steps (2) and (3). Step (6) generates groupings of data within similar heights at a similar latitude and longitude. And step (63) concludes with a visual display representing the data in 3D from measurements from wireless devices to display a selected wireless service condition metric of interest.

Those of ordinary skill in the art will recognize that the various methods and processes may be combined in whole or part to modify particular processes. Furthermore, certain steps can be optionally included in various embodiments. Those of ordinary skill in the art will recognize that the embodiment detailed herein is not limiting as to the manner in which the data can be manipulated or displayed.

What is claimed is:

1. A method of generating a visual representation in three dimensions of wireless measurements comprising:
   a. capturing a collection of data representing a plurality of wireless measurements from a plurality of wireless devices, respectively, each of the plurality of wireless measurements including location information indicating where the corresponding wireless measurement is made;
   b. determining a latitude and a longitude corresponding to each of the plurality of wireless measurements and determining a reference altitude based on said latitude and said longitude, the reference altitude being determined with respect to a geoid elevation;
   c. determining a reported altitude in a coordinate system of choice corresponding to each of the plurality of wireless measurements;
   d. subtracting the reference altitude from the reported altitude in the coordinate system of choice;

e. determining, based on a result of the subtracting, an estimated above-ground elevation corresponding to each of the plurality of wireless measurements; and f. displaying a visual representation of the collection of data within a three-dimensional graphical image based on the estimated above-ground elevations for the plurality of wireless measurements.

2. The method of claim 1, wherein the reported altitude is a WGS 84 altitude.

3. The method of claim 1, wherein each of the plurality of wireless measurements includes an accuracy associated with the corresponding location information, and wherein displaying the visual representation of the collection of data further comprises providing an absolute threshold to the collection of data and filtering the collection of data by comparing the accuracy for the corresponding wireless measurement with said absolute threshold to determine a subset of the collection data used for displaying the visual representation.

4. The method of claim 3, wherein the absolute threshold is between 1 meter and 100 meters.

5. The method of claim 1, wherein each of the plurality of wireless measurements includes an accuracy associated with the corresponding location information, and wherein displaying the visual representation of the collection of data further comprises providing a relative threshold to the collection of data and filtering the accuracy for the corresponding wireless measurement by the relative threshold to determine a subset of the collection data used for displaying the visual representation.

6. The method of claim 5, wherein the relative threshold is between 80% and 99% of a total number of samples in a dataset.

7. The method of claim 1, wherein displaying the visual representation comprises displaying a user density.

8. The method of claim 1, wherein displaying the visual representation comprises displaying a wireless service condition.

9. The method of claim 8, wherein the wireless service condition is selected from a group consisting of: 5G CSI-RSRP, 5G CSI-RSRQ, 5G CSI-SINR, 5G SS-RSRP, 5G SS-RSRQ, 5G SS-SINR, 5G PCI, 5G Most Frequent Cell, 5G Strongest Cell, 5G Most Frequent Band, 5G Strongest Band, 5G Optimization Priority, LTE CQI, LTE Most Frequent Band, LTE Most Frequent Cell, LTE Most Frequent PCI, LTE Most Frequent TAC, LTE Optimization Priority, LTE RSRP, LTE RSRQ, LTE SNR, LTE Strongest Band, LTE Strongest Cell, LTE Strongest PCI, LTE Strongest TAC, UMTS Ee/No, UMTS Most Frequent Band, UMTS Most Frequent Cell, UMTS Most Frequent LAC, UMTS Most Frequent PSC, UMTS RSSI, UMTS Strongest Band, UMTS Strongest Cell, UMTS Strongest LAC, UMTS Strongest PSC, GSM Most Frequent Band, GSM Most Frequent BSIC, GSM Most Frequent Cell, GSM Most Frequent LAC, GSM RSSI, GSM Strongest Band, GSM Strongest BSIC, GSM Strongest Cell, GSM Strongest LAC, CDMA Eclo, CDMA RSSI, EVDO Eclo, EVDO RSSI, User Density, Mobile Data Usage, WiFi Data Usage, Mobile+WiFi Data Usage, Downlink Throughput, Uplink Throughput, Jitter, Latency, Best Carrier 5G CSI-RSRP, Best Carrier 5G CSI-RSRQ, Best Carrier 5G CSI-SINR, Best Carrier 5G SS-RSRP, Best Carrier 5G SS-RSRQ, Best Carrier 5G SS-SINR, Best Carrier GSM RSSI, Best Carrier LTE CQI, Best Carrier LTE RSRP, Best Carrier LTE RSRQ, Best Carrier LTE SNR, Best Carrier UMTS Ee/No, Best CarrierUMTS RSSI, Coverage Improvement Opportunities, Multi-Network Coverage Improvement Score, Optimization Opportunities, Sales Opportunities, Percent Low Band, Timing Advance, and combinations thereof.

10. The method of claim 1, wherein displaying the visual representation comprises displaying a wireless service condition and a user density.

11. The method of claim 1, wherein displaying the visual representation comprises displaying the collection of data in a predetermined height segment.

12. The method of claim 1, wherein displaying the visual representation comprises displaying the plurality of wireless measurements in the visual representation within polygons segmented in sections.

13. A method of generating a visual representation in three dimensions of a wireless measurement comprising:

a. capturing a plurality of wireless measurements from a plurality of wireless devices, respectively, each of the plurality of wireless measurements including location information indicating where the corresponding wireless measurement is made;

b. determining a latitude and a longitude corresponding to each of the plurality of wireless measurements and determining a reference altitude from said latitude and said longitude, the reference altitude being determined with respect to a geoid elevation;

c. determining a reported altitude in a coordinate system of choice corresponding to each one of the plurality of wireless measurements;

d. subtracting the reference altitude from the reported altitude in the coordinate system of choice;

e. determining, based on a result of the subtracting, an estimated above-ground elevation corresponding to each of the plurality of wireless measurements; and f. generating a polygon on the visual representation corresponding to the estimated above-ground elevations for the plurality of wireless measurements so as to contain the plurality of wireless measurements based upon a predetermined threshold.

14. The method of claim 13, wherein the polygon is generated according to between 90% and 99% of the plurality of wireless measurements, each of said plurality of wireless measurements being defined within a given range of latitude and longitude.

15. The method of claim 14, wherein the given range of latitude and longitude are oriented to be within a polygon based on the predetermined threshold.

16. The method of claim 15, wherein the predetermined threshold is an absolute measurement of distance or a relative measurement based on a portion of the plurality of wireless measurements.

17. A method of generating a visual representation of a wireless service condition-m a three-dimensional display comprising:

a. capturing a wireless measurement comprising wireless service conditions from a wireless device, the wireless measurement including location information indicating where the wireless measurement is made;

b. determining a latitude and a longitude from the measurement and determining a reference altitude based on said latitude and said longitude, the reference altitude being determined with respect to a geoid elevation;

c. determining a reported altitude in a coordinate system of choice from the wireless measurement;

d. subtracting the reference altitude from the reported altitude in the coordinate system of choice;

e. determining, based on a result of the subtracting, an estimated above-ground elevation of the measurement; and f. displaying the wireless service condition within a three-dimensional graphical image in the visual representation based on the estimated above-ground elevation of the wireless measurement.

18. The method of claim 17, wherein the measurement includes an accuracy associated with the location information, and wherein displaying the wireless service condition further comprises providing a predetermined absolute threshold or relative threshold to the latitude and longitude to be compared to the accuracy associated with the location information for determining whether to use the estimated above-ground elevation of the measurement for the three-dimensional graphical image.

19. The method of claim 17, wherein the measurement includes an accuracy associated with the location information, and wherein displaying the wireless service condition further comprises providing a predetermined absolute threshold or relative threshold to the reported altitude in the coordinate system of choice to be compared to the accuracy associated with the location information for determining whether to use the estimated above-ground elevation of the measurement for the three-dimensional graphical image.

20. The method of claim 17, further comprising orienting the estimated above-ground elevation within a section of the three-dimensional graphical image.

21. The method of claim 20, wherein the section of the three-dimensional graphical image is between 5 meters and 50 meters in height.

22. The method of claim 21, wherein the section of the three-dimensional graphical image is 15 meters in height.

23. A method of generating a three-dimensional representation of wireless service conditions comprising:
   capturing a plurality of data measurements from a plurality of wireless devices, each of the plurality of data measurements including a measured latitude and longitude, and a reported altitude;
   determining a ground elevation at the measured latitude and longitude corresponding to each of the plurality of data measurements;
   determining an altitude corresponding to each of the plurality of data measurements by determining a delta between the reported altitude with the ground elevation; and
   displaying the plurality of data measurements within the three-dimensional representation of wireless service conditions, wherein the plurality of data measurements are arranged based on the measured latitude and longitude within slices in a vertical axis based on the determined altitude, wherein the slices are of a distance of between 5 meters and 50 meters, and wherein each of the plurality of data measurements comprises at least one wireless service condition.

24. The method of claim 23, wherein the wireless service condition is selected from the group consisting of: 5G CSI-RSRP, 5G CSI-RSRQ, 5G CSI-SINR, 5G SS-RSRP, 5G SS-RSRQ, 5G SS-SINR, 5G PCI, 5G Most Frequent Cell, 5G Strongest Cell, 5G Most Frequent Band, 5G Strongest Band, 5G Optimization Priority, LTE CQI, LTE Most Frequent Band, LTE Most Frequent Cell, LTE Most Frequent PCI, LTE Most Frequent TAC, LTE Optimization Priority, LTE RSRP, LTE RSRQ, LTE SNR, LTE Strongest Band, LTE Strongest Cell, LTE Strongest PCI, LTE Strongest TAC, UMTS Ee/No, UMTS Most Frequent Band, UMTS Most Frequent Cell, UMTS Most Frequent LAC, UMTS Most Frequent PSC, UMTS RSSI, UMTS Strongest Band, UMTS Strongest Cell, UMTS Strongest LAC, UMTS Strongest PSC, GSM Most Frequent Band, GSM Most Frequent BSIC, GSM Most Frequent Cell, GSM Most Frequent LAC, GSM RSSI, GSM Strongest Band, GSM Strongest BSIC, GSM Strongest Cell, GSM Strongest LAC, CDMA Eclo, CDMA RSSI, EVDO Eclo, EVDO RSSI, User Density, Mobile Data Usage, WiFi Data Usage, Mobile+WiFi Data Usage, Downlink Throughput, Uplink Throughput, Jitter, Latency, Best Carrier 5G CSI-RSRP, Best Carrier 5G CSI-RSRQ, Best Carrier 5G CSI-SINR, Best Carrier 5G SS-RSRP, Best Carrier 5G SS-RSRQ, Best Carrier 5G SS-SINR, Best Carrier GSM RSSI, Best Carrier LTE CQI, Best Carrier LTE RSRP, Best Carrier LTE RSRQ, Best Carrier LTE SNR, Best Carrier UMTS Ee/No, Best Carrier UMTS RSSI, Coverage Improvement Opportunities, Multi-Network Coverage Improvement Score, Optimization Opportunities, Sales Opportunities, Percent Low Band, Timing Advance, and combinations thereof.

25. The method of claim 23, wherein an absolute filter or relative filter is applied to the measured latitude and longitude to determine whether the corresponding data measurement is utilized in the three-dimensional representation of the wireless service conditions.

26. The method of claim 23, wherein an absolute filter or relative filter is applied to the determined altitude to determine whether the corresponding data measurement is utilized in the three-dimensional representation of the wireless service conditions.

27. The method of claim 23, further comprising an indoor classification wherein the indoor classification is used to determine whether the plurality of data measurements are utilized in the three-dimensional representation of the wireless service conditions.

* * * * *